United States Patent [19]

Irish

[11] 4,324,511
[45] Apr. 13, 1982

[54] CARRIER FOR PNEUMATIC TUBE SYSTEMS

[75] Inventor: John T. Irish, Indianapolis, Ind.

[73] Assignee: J. I. Industries, Incorporated, Indianapolis, Ind.

[21] Appl. No.: 127,600

[22] Filed: Mar. 6, 1980

[51] Int. Cl.³ .............................................. B65G 51/06
[52] U.S. Cl. ..................................... 406/189; 406/190
[58] Field of Search ................................ 406/184–190

[56] References Cited

U.S. PATENT DOCUMENTS 3,825,210  7/1974  Weaver .............................. 406/186

FOREIGN PATENT DOCUMENTS 2418899 10/1975  Fed. Rep. of Germany ...... 406/189
1379688 10/1964  France ................................. 406/188
 285214  1/1965  Netherlands ......................... 406/189

Primary Examiner—Jeffrey V. Nase
Attorney, Agent, or Firm—Jenkins, Coffey, Hyland, Badger & Conard

[57] ABSTRACT

A carrier capable of carrying elongated materials without bending or folding through conventional pneumatic tube systems which include a passageway having a predetermined inner cross-sectional dimension wherein the passageway includes curvatures having a predetermined radius. The carrier has a length greater than the maximum length of standard carriers which are currently used in conventional pneumatic tube systems. The carrier includes a first elongated member having an open end and a tapered closed end, a second member having an open end and a tapered closed end, the open ends of both the first and second members including cooperating threads for securing the members to each other to provide a closed elongated compartment, each of the members having an outer cross-sectional dimension which is smaller than the inner cross-sectional dimension of the passageway to allow passage of the elongated compartment through the tube curvatures without engaging the inner surface of the passageway, and each of the members further includes an accelerator ring for engaging the inner surface of the passageway, each of the accelerator rings having an outer cross-sectional dimension which is generally equal to the inner cross-sectional dimension of the passageway and a width which is small relative to the overall length of the elongated compartment.

8 Claims, 3 Drawing Figures

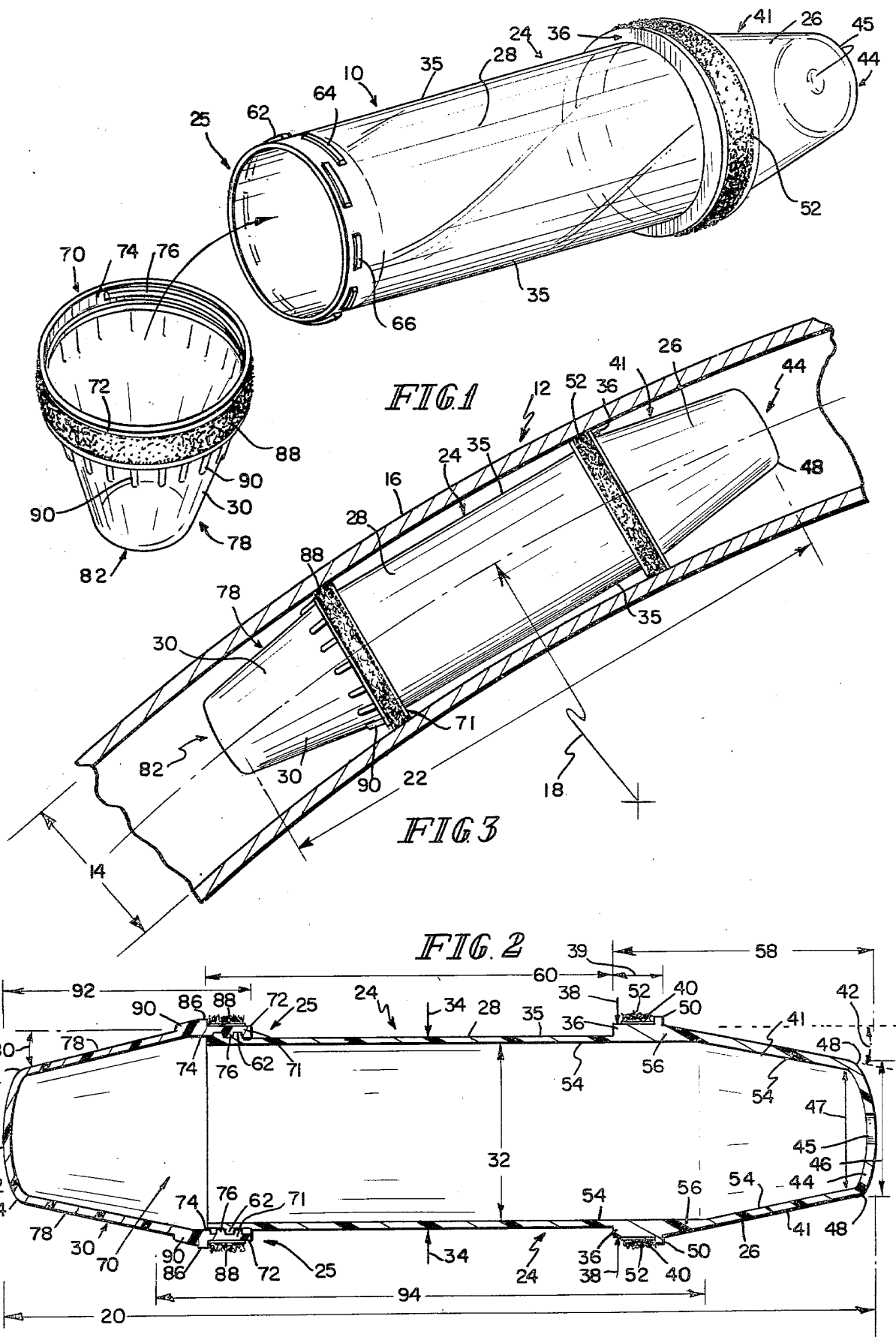

CARRIER FOR PNEUMATIC TUBE SYSTEMS

The present invention relates to conventional pneumatic tube systems which include a closed passageway having a predetermined inner cross-sectional dimension wherein the passageway includes curves having a predetermined radius and fluid pressure is controlled within the passageway to move a carrier. More particularly, the present invention relates to an improved carrier having a length greater than the length of the carriers currently used in these conventional pneumatic tube systems which is capable of passing through the passageway of the conventional pneumatic tube systems and carrying elongated material without bending or folding.

Many pneumatic tube systems are well known in the art. In general, these systems include a closed continuous passageway having a predetermined inner cross-sectional dimension where the passageway includes a plurality of curves or bends having a predetermined radius. A fluid, such as air, is controllably forced through the passageway in a loop to move a carrier through the passageway. In order for the carrier to move freely through the passageway, the dimensions, and in particular the length, of the carriers being used have been limited by the inner cross-sectional dimension and curvature radius of the passageway. In most cases, the conventional pneumatic systems have been designed with an inner cross-sectional dimension and a curvature radius for accommodating carriers of conventional design having a length limited to carrying materials, and in particular paper, of less than 12.000 inches (30.480 cm) in length or width. At the time many pneumatic systems were installed, a need did not exist for a system having an inner cross-sectional dimension and a curvature radius capable of accommodating carriers for carrying materials having a length or width greater than 12.000 inches (30.480 cm.). Furthermore, if such a need did exist, it was so infrequent that there was no demand for a pneumatic system having such capabilities. Accordingly, most pneumatic systems which are in present use have inner cross-sectional dimensions and a curvature radius which have been designed for standard carriers having a length less than 12.000 inches (30.480 cm.).

With the increase in technology, and in particular with the increased use of computers and computer printouts, the need has developed for pneumatic systems which can carry material having a length or width greater than 12.000 inches (30.480 cm.). For those individuals desiring to install new pneumatic tube systems, the inner cross-sectional dimension and the curvature radius of the passageway may be increased to accommodate a longer carrier of conventional design. However, for those individuals who have existing pneumatic systems which were designed to accommodate standard carriers having a length of 12.000 inches (30.480 cm.) or less and who do not desire to replace their existing system with a new system, some other means must be employed for carrying material having a length or width greater than the 12.000 inches (30.480 cm.) from one location to another.

The present invention provides an elongated carrier for carrying material having a length or width greater than 12.000 inches (30.480 cm.) which, in accordance with its improved construction, is capable of being used in conventional pneumatic systems having an inner cross-sectional dimension and curvature radius designed for accommodating carriers of conventional design having a length less than 12.000 inches (30.480 cm.). In particular, the elongated carrier of the present invention has a length sufficient for carrying documents or other materials having a length or width of approximately 15.000 inches (38.100 cm.) without folding or bending.

It is, therefore, one object of the present invention to provide an improved carrier capable of carrying elongated materials without bending or folding through conventional pneumatic systems which include a closed passageway having a predetermined inner cross-sectional dimension where the passageway includes curves or bends having a predetermined radius. The conventional systems are designed to accommodate carriers of conventional design with a length limited by the predetermined curvature radius of the passageway.

The carrier, according to the present invention, includes a first elongated member having an open end and a tapered closed end, a second member having an open end and a tapered closed end, means for securing the members to each other to provide a closed elongated compartment, each of the members having an outer cross-sectional dimension which is smaller than the inner cross-sectional dimension of the passageway so that the elongated compartment can pass through the curves of the pneumatic system without engaging the inner surface of the passageway, and each of the members further including means for engaging the inner surface of the passageway to accelerate and stabilize the compartment within the passageway, the surface-engaging means means having an outer cross-sectional dimension which is generally equal to the predetermined inner cross-sectional dimension of the passageway.

Further, according to the present invention, the tapered closed ends of the first and second members are frustoconically shaped and have rounded features to facilitate movement of the carrier through the passageway of the pneumatic system. The first member includes an elongated intermediate section formed integrally with the open end and tapered closed end so that the inner surface of the first member is smooth and continuous. The second member provides a cap for closing the open end of the first member. Both the open end of the first member and the open end of the second member include cooperating threads providing means for securing the second member to the first member to form the closed elongated compartment.

Further, according to the present invention, the surface-engaging means includes a first accelerator ring formed on the perimeter of the first member and a second accelerator ring formed on the perimeter of the second member. Each of the accelerator rings has an outer cross-sectional dimension which allows it to engage the inner surface of the passageway to provide stability to the carrier and allow the carrier to be moved in response to the controlled air pressure within the passageway. Each of the accelerator rings has a small width in relationship to the overall length of the closed elongated compartment, and each is located in proximity to the tapered closed ends of the first and second members.

Other features of the carrier of the present invention include the fact that when the second member is removed from the first member, elongated material being carried will protrude from the open end of the first member to facilitate removal of the material from the first member. Furthermore, the second member is independent of the first member and, therefore, may be easily replaced if damaged or lost without replacing the entire carrier.

While various features and advantages of the present invention have been described above, other features and advantages will become apparent from the following detailed description of one embodiment of the present invention, which description should be considered in conjunction with the accompanying drawings, in which:

FIG. 1 is an exploded perspective view of an a carrier for pneumatic tube systems according to the present invention;

FIG. 2 is a longitudinal cross-sectional view of the carrier of FIG. 1; and

FIG. 3 is a cross-sectional view of a curved section of a conventional pneumatic system passageway illustrating the adaptability of the carrier of FIGS. 1 and 2 to conventional pneumatic systems having a predetermined inner cross-sectional diameter and a predetermined curvature radius.

In general, the carrier of the present invention is most advantageously adapted for use in conventional pneumatic tube systems which were originally designed to accommodate carriers having a length limited to 12.000 inches (30.480 cm.) or less. Because of the previous construction of conventional carriers, their length has been limited by the cross-sectional dimension and curvature radius of the passageway of the conventional pneumatic tube. The carrier of the present invention is designed to have a length greater than 12.000 inches (30.480 cm.) and to be capable of passing through the passageway of conventional, pneumatic tube systems. Accordingly, for those conventional pneumatic tube systems, the carrier of the present invention allows elongated documents or material having a length or width which is greater than 12.000 inches (30.480 cm.) to be carried through the passageway of the pneumatic systems without bending or folding.

FIGS. 1, 2, and 3 show a carrier 10 having improved design features according to the present invention which make it adaptable for use in conventional pneumatic tube systems 12. The typical pneumatic tube system 12 employs a forced fluid, such as air, to move a carrier of conventional construction (not shown) having a length of 12.000 inches (30.480 cm.) or less through a passageway having a predetermined cross-sectional inner diameter 14 of approximately 4.000 inches (10.160 cm.). The passageway includes a plurality of curved sections 16 which subtend angles anywhere between 0° to 90°. These curved sections 16 are comonly known in the art as "Ls." The curved sections 16 of the conventional pneumatic systems 12 form an arc of an imaginary circle having a radius 18 of 45.000 inches (114.30 cm.). In accordance with conventional carrier design, these dimensions of the conventional pneumatic tube systems 12 were established to accommodate carriers having a length of 12.000 inches (30.480 cm.) or less. Accordingly, material having a length or width greater than 12.000 inches (30.480 cm.) had to either be folded or bent to be inserted in the conventional carrier or transported from one location to another by other means.

In accordance with the present invention, a carrier 10 is capable of carrying materials having a length or width which is greater than 12.000 inches (30.480 cm.); and in one embodiment, the carrier 10 has an outer length 20 of 15.500 inches (39.370 cm.) and an inner length 22 of 15.000 inches (38.100 cm.). Illustratively, therefore, the carrier 10 shown in FIGS. 1, 2, and 3 is capable of holding material and/or documents having a width or length of 15.000 inches (38.100 cm.) or less without folding or bending.

Continuing to refer to FIGS. 1, 2, and 3, the carrier 10 includes an elongated cylindrical tubular member 24 having a cylindrical, open-end section 25; a frustoconically shaped, closed-end section 26; and a cylindrical intermediate section 28 formed integrally with the open-end section 25 and the closed-end section 26. In an illustrative embodiment of the carrier 10, the elongated tubular member 24 is molded as a unit from a transparent plastic material, such as a clear polycarbonate material. It will be understood, however, that the tubular member 24 may be constructed of other material without departing from the scope of the present invention. The carrier 10 also includes a removable second member or cap 30 for closing the open-end section 25 of the tubular member 24 to provide a closed elongated carrier compartment. The cap 30 may also be molded from the same transparent plastic material forming the elongated tubular member 24. Furthermore, the plastic material used to form the cap 30 may be colored to identify and distinguish the removable cap 30 from the permanently attached, closed-end section 26 of the tubular member 24.

The cylindrical, open-end section 25 and intermediate section 28 of the tubular member 24 have an inner cross-sectional diameter 32 of approximately 3.125 inches (7.938 cm.), an outer cross-sectional diameter 34 of approximately 3.375 inches (8.573 cm.), and a smooth, continuous outside surface 35. The proximal portion 36 of the frustoconically shaped, closed-end section 26 includes a circumferential accelerator ring 36 for engaging the inner surface of the passageway of the pneumatic system 12 to stabilize the carrier 10 and generally seal the passageway so that the carrier 10 is moved through the passageway in response to controlled air pressure. The accelerator ring 36 has an outer cross-sectional diameter 38 of approximately 3.625 inches (9.208 cm.) and a width 39 of approximately 0.6875 inch (1.746 cm.). The width 39 of the accelerator ring 36 is maintained as small as possible relative to the overall length 20 of the carrier 10 to reduce the amount of friction associated with the engagement of the ring 36 with the inner surface of the passageway of the pneumatic system 12. As best seen in FIG. 2, the accelerator ring 36 is integrally molded with the tubular member 24 and is, therefore, constructed of the same material as the tubular member 24. Accelerator ring 36 includes an outer surface 40 elevated in parallel relationship to the outer surface 35 of the intermediate section 28 and open-end section 25 of the tubular member 24.

The closed-end section 26 further includes an intermediate portion 41 gradually tapering inwardly away from the accelerator ring 36 at an angle 42 of approximately 10° or greater, measured relative to outer surface 40 of the accelerator ring 36. The intermediate portion 41 terminates in a domed distal portion 44 provided with a centrally positioned aperture 45 to allow equalization of internal and external pressures on the carier 10. The domed distal portion 44 has a cross-sectional outer diameter 46 of 2.250 inches (5.715 cm.), a cross-sectional inner diameter 47 of 2.009 inches (5.080 cm.), and rounded outer edges 48. The domed and rounded features of the closed-end section 26 facilitate movement of the carrier 10 within the pneumatic tube system 12 by preventing the carrier 10 from being lodged or jammed within the passageway.

As best illustrated in FIG. 2, the accelerator ring 36 further includes an annular lip 50 having an outer cross-sectional diameter of approximately 3.875 inches (9.843 cm.). Encompassing the tubular member 24 on the outer surface 40 of the accelerator ring 36 is a 0.1250 inch (0.3175 cm.) thick felt or VELCOR ® strip which provides a smooth flexible surface for sealing engagement of the accelerator ring 36 with the inner surface of the passageway of the pneumatic system 12.

Continuing to refer to FIG. 2, the tubular member 24 has a smooth, continuous inner surface 54 which reduces the possibility of uneven surfaces which might obstruct the removal and insertion of material. The inner surface 54 tapers inwardly in conjunction with the tapering of intermediate portion 41 of closed-end section 26; however, it should be noted that the inner surface 54 extends longitudinally into the closed-end section 26 beyond the proximal portion or accelerator ring 36 before it begins to taper inwardly so that a structurally reinforced area 56 is formed at the shear line between the accelerator ring 36 and the intermediate portion 41 of the closed-end section 26.

In the illustrative embodiment, the outer length 58 of the closed-end section 26 is approximately 4.500 inches (11.430 cm.). Furthermore, the combined length of the open-end section 25 and the intermediate section 28 of the tubular member 24 is approximately 7.125 inches (18.098 cm.), producing an overall length for the tubular member 24 of approximately 11.625 inches (29.528 cm.).

Formed circumferentially around the open-end section 25 of the tubular member 24 are a plurality of segmented flanges 62 which serve as threads for securing the cap 30 of the tubular member 24. The flanges 62 are segmented into elongated threads 64 and short threads 66 to minimize surface friction between the open-end section 26 and the cap 30. This feature facilitates removal of the cap 30 by lessening the chance that the cap 30 will become locked in the closed position due to surface friction.

The cap 30 includes a cylindrical open-end section 70 which cooperates with the open-end section 25 of the tubular member 24 to form the closed elongated carrier compartment. The cylindrical open-end section 70 has an outer cross-sectional diameter generally equivalent to the outer cross-sectional diameter of the proximal portion 36 of the closed-end section 26 of the tubular member 24. As can therefore be seen in FIG. 2, the cylindrical open-end section 70 forms a second accelerator ring 71 for sealingly engaging the inner surface of the passageway of the pneumatic system 12. The width of the accelerator ring 71 is generally equivalent to the width of the accelerator ring 36 formed on the closed-end section 26 of the tubular member 24. The open-end section 70 of cap 30 has an outer surface 72 which is elevated in parallel relationship to the outer surface 35 of the open-end section 25 and intermediate section 28 of the tubular member 24 when the cap 30 is secured to the tubular member 24. The open-end section 70 also includes a threaded inner surface 74 having threads 76 for engaging the segmented threads 62 formed on outer surface 35 of the open-end section 25 of the tubular member 24, thereby providing means for securing the cap 30 to the tubular member 24.

An intermediate section 78 tapers inwardly from the open-end section 70 of cap 30 at an angle 80 of approximately 10° or greater relative to the outer surface 72 of the open-end section 70. The intermediate section 78 terminates in a domed, closed-end section 82 having cross-sectional inner and outer diameters generally equivalent to the cross-sectional inner and outer diameters 46, 47 of the domed, distal portion 44 of the closed-end section 26 of the tubular member 24. Furthermore, the cap 30 includes rounded outer edges 84 similar to these of the domed portion 44 of the tubular member 24.

An annular lip 86 having an outer cross-sectional diameter generally equivalent to the outer cross-sectional diameter of the annular lip 50 is formed on the open-end section 70 of the cap 30 and a 0.125 inch (0.3175 cm.) felt or VELCOR ® strip 88 circumferentially encompasses the outer surface 72 of the accelerator ring 71 to provide a smooth flexible surface for sealing engagement of the accelerator ring 71 with the inner surface of the passageway of the pneumatic system 12.

Extending longitudinally along the tapering intermediate section 78 of the cap 30 are a plurality of equally spaced reinforcement ribs 90 which also serve as a grip for rotating the cap 30 on the open-end section 25 of the tubular member 24. Ribs 90 provide structural support to the intermediate section 78 of the cap 30 in proximity to the shear line between the intermediate section 78 and the open-end section 70 of the cap 30.

In an illustrative embodiment, the cap 30 has a length 92 of approximately 4.50 inches (11.430 cm.) which is generally equivalent to the length 58 of the closed-end section 26 of the tubular member 24. Accordingly, the accelerator rings 36 and 71 are each located equal distances from respective ends of the carrier 10, Referring to FIG. 2, the intermediate section 28 of the tubular member 24 has an outer cross-sectional diameter 34 which is reduced relative to the accelerator rings 36 and 71 to prevent engagement of the outer surface 35 of the intermediate section 28 with the inner surface of the passageway of the pneumatic system 12. As best illustrated in FIG. 3, this feature is particularly significant when the carrier 10 is passing through a curved section 16 of the passageway of conventional pneumatic tube systems 12.

As a further feature of the carrier 10, it can be seen in FIG. 2 that when the cap 30 is secured to the tubular member 24, the inner surface 54 of the tubular member 24 and the inner surface 74 of the open-end section 70 of the cap 30 form an area within the closed elongated compartment of the carrier 10 having a length 94 of approximately 10.000 inches (25.400 cm.) and an inner cross-sectional diameter generally equivalent to the inner cross-sectional diameter 32 of the open-end section 25 and intermediate section 28 of the tubular member 24.

What is claimed is:

1. In a pnaumatic tube system of the type including a tube having a predetermined inner cross-sectional dimension wherein the tube includes curved sections having a predetermined radius for passage of a carrier, the improvement comprising: a carrier having a length greater than 12.000 inches (30.480 cm) for holding elongated material and for passing through the pneumatic tube system having the predetermined dimensions, the carrier including a tubular compartment having a reduced outer cross-sectional dimension and an inner surface with a uniform cross-sectional dimension, tapered elongated end sections, at least one of the end sections being removable to gain access to the compartment, each end section including a domed distal portion, a proximal portion, a tapered intermediate portion therebetween, and means perimetrally encompassing the end sections for engaging the inner surface of the tube to stabilize the carrier, the tube-engaging means having an outer cross-sectional dimension generally equal to the inner cross-sectional dimension of the tube, cooperating threads formed on the tubular compartment and on the proximal portion of the one end section for securing the one end section to the tubular compartment, the threads on at least one of the tubular compartment and the one end section including a plurality of long and short segments intermittingly spaced apart, at least the one end section including a plurality of reinforcing ribs extending longitudinally along the intermediate portion thereof, and a structurally reinforced area between the other end section and the tubular compartment, the reinforced area including an extension of the inner surface of the tubular compartment into the other end section.

2. In combination with a pneumatic carrier system of the type including a passageway having a predetermined inner diameter of approximately 4.00 inches (10.160 cm) wherein the passageway includes curves having a predetermined radius of approximately 45.00 inches (114.30 cm), a carrier comprising: an elongated first member having an inner surface with a uniform cross-sectional dimension, an open end, and a tapered closed end, a second member having an open end and a tapered closed end, cooperating threads on the first and second members for securing the members to each other to provide a closed elongated compartment having an inner length of approximately 15.00 inches (38.10 cm), the threads on at least one of the members including a plurality of long and short segments intermittingly spaced apart to reduce surface friction between the cooperating threads, each of the members having an outer cross-sectional dimension which is smaller than the inner cross-sectional diameter of the passageway to allow passage of the elongated compartment through the passageway curvatures without engaging the inner surface of the passageway, and each of the members including means for engaging the inner surface of the passageway to accelerate and stabilize the compartment within the passageway, the surface-engaging means having an outer cross-sectional dimension which is generally equal to the predetermined inner diameter of the passageway, a structurally reinforced area in proximity to the tapered closed end of the elongated first member, the reinforced area including an extension of the inner surface of the elongated first member into the tapered closed end and an extension of the outer surface of the tapered closed end toward the open end, and a plurality of reinforcing ribs extending longitudinally along the second member.

3. An elongated carrier for conventional pneumatic carrier systems of the type including a passageway having a predetermined inner cross-sectional diameter wherein the passageway includes curved sections having a predetermined radius, the carrier comprising: an elongated cylindrical tubular member having a reduced outer cross-sectional diameter which allows passage of the tubular member through the passageway without engaging the inner surface of the passageway; the tubular member including an open-end section, a frustoconically shaped closed-end section, an elongated intermediate section connecting the end sections and having an inner surface with a uniform cross-sectional dimension, and a first circumferential accelerator ring for engaging the inner surface of the passageway, the first accelerator ring including a portion of the closed-end section having an outer cross-sectional diameter which is greater than the reduced cross-sectional diameter of the tubular member; a structurally reinforced area between the closed-end section and the intermediate section of the tubular member, the reinforced area being formed by an extension of the inner surface of the intermediate section and the portion of the closed end section; a frustoconically shaped cap for closing the open-end section of the tubular member, the cap including a second circumferential accelerator ring for engaging the inner surface of the passageway and a plurality of longitudinally extending reinforcing ribs, the second accelerator ring having an outer cross-sectional diameter generally equivalent to the cross-sectional diameter of the first acclerator ring; and cooperating threads for securing the cap to the tubular member to provide a closed, elongated compartment having an inner length which is greater than 12.000 inches (30.480 cm.), the threads on at least one of the cap and tubular member including a plurality of long and short segments intermittingly spaced apart to reduce surface friction between the cooperating threads.

4. A carrier for pneumatic tube systems of the type which include a passageway and a controlled fluid source for moving the carrier through the passageway, comprising a first frustoconically shaped end section; a second frustoconically shaped end section integrally formed with an elongated intermediate section; each end section including a domed distal portion, a proximal portion having an outer surface with a cross-sectional dimension for engaging the inner surface of the passageway, and a tapered intermediate portion therebetween; the intermediate section having an outer surface with a cross-sectional dimension which is smaller than the outer cross-sectional dimension of the proximal portions of the end section and an inner surface with a uniform cross-sectional dimension; the first end section being removable to allow access to the intermediate and second end sections; cooperating threads formed on an inner surface of the first end section and on the outer surface of the intermediate section for securing the first end section to the intermediate section; the threads on at least one of the first end section and the intermediate section including a plurality of long and short segments intermittingly spaced apart to reduce surface friction between the cooperating threads; at least the first end section including a plurality of spaced-apart ribs extending longitudinally from the proximal portion toward the distal portion for reinforcement of the intermediate portion thereof; and a structurally reinforced area between the proximal portion of the second end section and the intermediate section, the reinforced area being formed by an extension of the inner surface of the intermediate section to the intermediate portion of the second end section.

5. The carrier as recited in claim 4 wherein the end sections and intermediate section have a combined length which is greater than 12.000 inches (30.480 cm.).

6. The carrier as recited in claim 5 wherein the proximal portions of the end sections have a width which is smaller in relation to the overall combined length of the end sections and intermediate section.

7. The carrier as recited in claim 6 wherein the proximal portions of the end sections include a perimetral band of smooth flexible material and a perimetral lip for limiting movement of the band of material.

8. The carrier as recited in claim 7 wherein the end sections are tapered at an angle of at least 10° relative to the outer surface of the proximal portions thereof.

* * * * *